US 9,535,907 B1

(12) United States Patent
Stringham

(10) Patent No.: US 9,535,907 B1
(45) Date of Patent: Jan. 3, 2017

(54) SYSTEM AND METHOD FOR MANAGING BACKUP OPERATIONS OF VIRTUAL MACHINES

(75) Inventor: Russell R. Stringham, Orem, UT (US)

(73) Assignee: Veritas Technologies LLC, Mountain View, CA (US)

(*) Notice: Subject to any disclaimer, the term of this patent is extended or adjusted under 35 U.S.C. 154(b) by 944 days.

(21) Appl. No.: 12/713,626

(22) Filed: Feb. 26, 2010

Related U.S. Application Data

(63) Continuation of application No. 12/692,572, filed on Jan. 22, 2010.

(51) Int. Cl.
  *G06F 17/30* (2006.01)
  *G06F 11/14* (2006.01)

(52) U.S. Cl.
  CPC ..... *G06F 17/30008* (2013.01); *G06F 11/1435* (2013.01); *G06F 11/1446* (2013.01)

(58) Field of Classification Search
  CPC .............. G06F 11/1435; G06F 11/1446; G06F 11/1451; G06F 11/1453; G06F 11/1456; G06F 11/1461; G06F 11/1464; G06F 17/302; G06F 2201/84; G06F 17/30348; G06F 3/0617; G06F 3/0641; G06F 3/065; G06F 3/067
  See application file for complete search history.

(56) References Cited

U.S. PATENT DOCUMENTS

| 7,730,486 | B2* | 6/2010 | Herington | 718/1 |
| 8,046,550 | B2* | 10/2011 | Feathergill | 711/162 |
| 2009/0300080 | A1* | 12/2009 | Stringham | 707/204 |
| 2010/0049930 | A1* | 2/2010 | Pershin et al. | 711/162 |
| 2010/0077165 | A1* | 3/2010 | Lu et al. | 711/162 |
| 2010/0125712 | A1* | 5/2010 | Murase et al. | 711/162 |
| 2010/0228913 | A1* | 9/2010 | Czezatke et al. | 711/112 |

* cited by examiner

*Primary Examiner* — Dinku Gebresenbet
(74) *Attorney, Agent, or Firm* — Campbell Stephenson LLP

(57) ABSTRACT

A method, system, and computer-readable storage medium for managing backup operations of virtual machines are provided. According to one embodiment, a backup application initiates a snapshot of a storage volume, which stores a collection of virtual hard disk drives. A collection of virtual machines access the collection of virtual hard disk drives. The backup application accesses a collection of lists of changes to data. The collection of lists and the data are stored in the collection of virtual hard disk drives. A first list among the collection of lists is generated by a first virtual machine. The changes to data are made by the collection of virtual machines. The backup application generates an incremental backup of the first virtual hard disk drive by copying data from the snapshot in response to the first list identifying that the data changed subsequent to the generation of the prior backup.

20 Claims, 9 Drawing Sheets

*Fig. 3*

SYSTEM AND METHOD FOR MANAGING BACKUP OPERATIONS OF VIRTUAL MACHINES

CROSS-REFERENCE TO RELATED APPLICATIONS

This application is a continuation of U.S. patent application Ser. No. 12/692,572, entitled "System and Method For Managing Backup Operations of Virtual Machines," filed Jan. 22, 2010, and naming Russell R. Stringham as the inventor. This application is assigned to Symantec Corporation, the assignee of the present invention, and is hereby incorporated by reference in its entirety and for all purposes as if completely and fully set forth herein.

FIELD OF THE INVENTION

This invention relates to data processing systems, and in particular, managing virtual data processing systems. Still more particularly, this invention relates to managing backup of virtual data processing systems.

DESCRIPTION OF THE RELATED ART

As modern network connectivity improves, distributed computing is becoming more common. A distributed computing system can include multiple computing nodes (also referred to simply as "nodes") that communicate through a network to access data stored on a shared storage device. The shared storage device can be implemented using a storage area network (SAN).

While modern network connectivity improves, modern computers are also becoming more powerful. This increased computing power can be harnessed by implementing virtual machines. Virtual machines are software implementations of physical computers that execute computer instructions in the manner of physical computer hardware. Many of today's computer systems, such as computing nodes in a distributed computing system, are able to act as host computer systems to multiple virtual machines. The virtual machines implemented by computing nodes can also access data stored on a shared storage device.

Many distributed computing systems offer the advantage of being fault tolerant. In other words, if one of the nodes becomes unavailable due to failure, maintenance, or increased consumption of computing resources, the other nodes in the distributed computing system can compensate for the reduced computing capacity by transferring pending tasks from the failed node to the other nodes in the distributed computing system.

In order to provide improved fault tolerance, distributed computing systems need to be able to protect against data loss due to failures or errors. One way to safeguard against such data loss is by implementing a backup application. The backup application, which can be executed on at least one of the nodes on a distributed computing system, can periodically backup the data stored on the shared storage device accessed by those nodes. In the event of a failure that results in data loss or corruption, the data on the shared storage device can be recovered via a backup or data archive created by the backup application.

One drawback to such an implementation of a backup application is that performing a backup of the entire shared storage device accessed by the nodes can be time and resource intensive (both in computing and network resources), particularly in the case of a very-high capacity shared storage device. Thus, it can be desirable to backup only the portions of the shared storage device accessed by particular virtual machines implemented by the nodes. However, backing up only the portions of the shared storage device accessed by the virtual machines (especially in the case of incremental backups) currently requires an installation of an instance of a backup application within each individual virtual machine. Such installation greatly complicates the administration of the distributed computing system, since a system administrator must install and maintain each individual instance of the backup application. In the case where a node supports multiple virtual machines, the computing resources of the node can be taxed if each virtual machine supported by the node simultaneously executes an instance of the backup application.

Thus, what is desirable is an approach that enables at least partial backups of a shared storage device, but does not require the installation of a backup application within each virtual machine supported by a distributed computing system.

SUMMARY OF THE INVENTION

According to one embodiment, a backup application initiates a snapshot of a storage volume. A collection of virtual machines access a collection of virtual hard disk drives stored on the storage volume. The backup application accesses a collection of lists of changes to data. The data is stored in the collection of virtual hard disk drives. The collection of lists is stored in the collection of virtual hard disk drives. A first list among the collection of lists is generated by a first virtual machine among the collection of virtual machines. The first virtual machine access a first virtual hard disk drive among the collection of virtual hard disk drives. The changes to data are made by the collection of virtual machines and the changes to data are made subsequent to generation of a prior backup. The backup application generates an incremental backup of the first virtual hard disk drive by copying data from the snapshot in response to the first list identifying that the data changed subsequent to the generation of the prior backup.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 3 illustrates a change list, according to one embodiment.

DETAILED DESCRIPTION

Introduction

Figure 1:
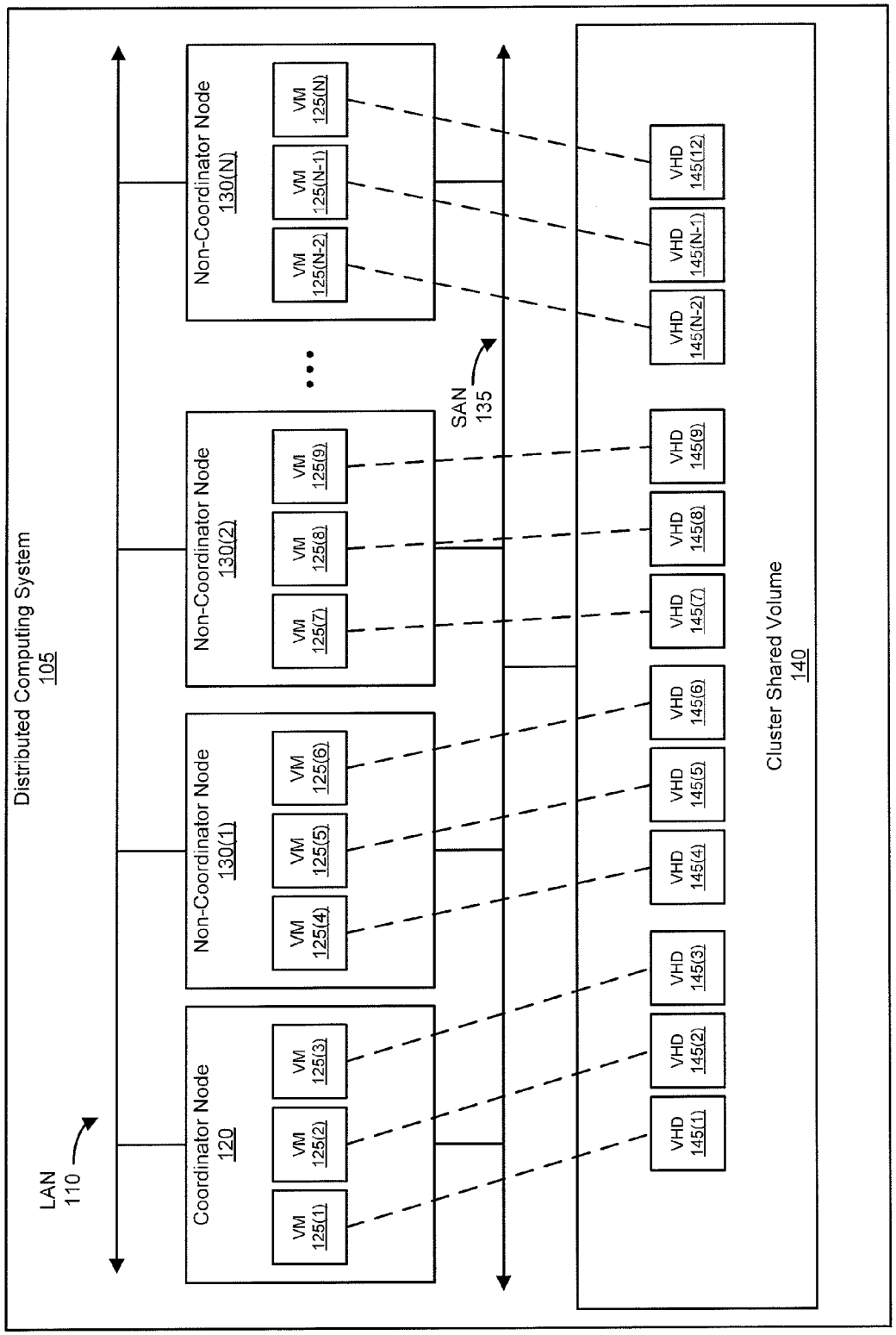
FIG. 1 is a block diagram illustrating a system that includes a collection of nodes and a cluster shared volume (CSV), according to one embodiment.

Embodiments of the present invention allow a distributed computing system to make backups of a shared storage device. The distributed computing system includes a collection of nodes that accesses and modifies data stored on a shared storage device. Each node in the collection of nodes also implements at least one virtual machine, which accesses and stores data within one or more virtual hard drives on the shared storage device. The backups of the shared storage device are made without installing a backup application or utility in each of the virtual machines implemented by the nodes of the distributed computing system. In some embodiments, each of the nodes includes a backup application, but the backup application is active on one node at a time. Thus, among a collection of nodes, if a backup application is active on a first node, the backup applications are inactive on the other nodes in the collection of nodes.

Instead, each node of the distributed computing system includes at least one change tracker. During normal operation of the distributed computing system, each change tracker notes changes made to data by one or more virtual machine(s) supported by the node. After a virtual machine makes changes to data, the change trackers record the changes to a change list. According to one embodiment, each node in the distributed computing system includes a change tracker that tracks the changes made by virtual machines supported on that node. According to another embodiment, each virtual machine in each node of the distributed computing system includes a change tracker that tracks the changes made by that virtual machine. Both of these embodiments can generate local change lists, which each record the changes made to the data by a particular node or virtual machine. Each local change list can be stored on the shared storage device or locally on the node that generated that local change list. In the case where each virtual machine includes a change tracker, the local change list can be stored within a virtual hard disk drive allocated to the virtual machine. In the case where each node in the distributed computing system includes a change tracker, the local change lists can be aggregated into a composite change list that records all the changes made by all of the virtual machines executing on all of the nodes in the distributed computing system. Embodiments of the invention can store the composite change list on the shared storage device.

One of the nodes (called a "coordinator node") also implements a backup application. The backup application performs a variety of functions including snapshot and backup generation. Periodically, the backup application takes snapshots of the shared storage device. A snapshot is a point-in-time copy of the data stored on the shared storage device.

After the snapshot is taken, the backup application periodically generates backups from these snapshots. A backup is an additional copy of data that is used to restore an original copy of data after a data loss event. Examples of data loss events include a disaster such as natural disasters (e.g., flood, fire, earthquake, etc.), man-made disasters (e.g., hardware failure, power failure, programming errors, malicious software attacks, etc.), or data that has been accidentally deleted or corrupted due to program or human error.

Generally, backup applications perform two major types of backups: full backups and incremental backups. A full backup includes a complete copy of all the files stored on the shared storage device. An incremental backup attempts to backup only part of the data stored on the shared storage device. According to some embodiments, an incremental backup only includes data that has been changed since a prior backup (e.g., the most recent backup). The prior backup relative to the incremental backup can be a full backup or an incremental backup.

When a backup application requests a snapshot of the shared storage device, the coordinator node notifies all of the other nodes in the distributed computing system to switch from direct I/O to redirected I/O (both of which are described in more detail below in conjunction with FIG. 1). After the other nodes transition to redirected I/O, the coordinator node continues the snapshot generation process by propagating a quiesce event to all of the other nodes in the distributed computing system. A quiesce event causes applications executing on the nodes (whether external to or internal to any virtual machines executing on the nodes) to first update their data files to a consistent state by sending locally stored changes to data to the shared storage device. Then, the quiesce event causes the applications to temporarily suspend access to the shared storage device. Once access to the shared storage device has been temporarily suspended and operations on the data are completed, the shared storage device is in a consistent state. A storage device is in a consistent state when all transactions to that data stored on the storage device have been completed, or enough information has been written to the storage device to either complete or rollback incomplete transactions at a future time (such as when the backup is restored). The nodes further propagate the quiesce event to their respective virtual machines. Once the nodes indicate to the backup application that the quiesce event has been received and completed, the backup application takes a snapshot of the shared storage device.

Once the backup application generates a snapshot, all change trackers update their change lists to include all changes detected as occurring before the snapshot was taken. At this point, according to one embodiment, the change trackers can each start a new local change list to record changes occurring after the snapshot. According to another embodiment, the change trackers can continue modifying their respective current local change lists, but each change tracker provides a marker in its respective local change list that separates the changes that occurred before the snapshot from the changes that occurred after the snapshot.

In response to a snapshot being taken, the change trackers or backup application also copy the changes recorded in the local change lists (if implemented) to a composite change list. The composite change list includes all the changes made by the nodes in the distributed computing system since the last backup. If a change tracker is implemented within each virtual machine on each node, a process inside of each virtual machine can communicate the local change list for that virtual machine to the backup application by sending the local change list over the network or by writing the local change list to the shared storage device. In the alternative, the backup application can access the local change list from within the virtual hard drive allocated to the virtual machine. When change tracking occurs inside each virtual machine, a composite change list is not used because the backup application can only access the local change lists of the virtual machines and will need to backup each virtual hard disk drive (or the volumes stored within each virtual hard disk drive) separately, rather than backing up the complete shared storage device. Those local change lists track changes to the virtual hard drive(s) associated with the virtual machine, but do not track any changes to files located outside of the virtual hard drive(s). Thus, a composite change list assembled from the local change lists would represent an incomplete change list of the cluster shared volume since only the changes within the virtual hard drives are tracked.

Once the backup application takes the snapshot, the backup application can generate a backup from the snapshot. As previously discussed, the backup can be a full backup, which is a complete backup of all the data on the shared storage device at the particular point-of-time the snapshot was taken. The backup can also be an incremental backup, which is a backup of all changes made to the data on the shared storage device since the last backup. The backup can also selectively include only data from particular regions of the shared storage device (e.g., the backup can be performed on a per-node or per-virtual machine basis). In the case of a full backup, change tracking is not required to be active, since the entire shared storage device is to be backed up regardless of changes made to the data. However, if change tracking is not active, change tracking should begin with a snapshot of the entire shared storage device if an incremental backup will be generated relative to the full backup.

An Example Architecture for Managing Backup Operations of Virtual Machines

FIG. 1 is a simplified block diagram that illustrates a distributed computing system (e.g., distributed computing system 105) that can be used to implement embodiments of the invention. As illustrated, distributed computing system 105 includes a collection of computing nodes (e.g., a coordinator node 120 and non-coordinator nodes 130(1)-(N)). These nodes communicate with each other via a network such as a local area network (LAN) 110. The nodes can be implemented as computer systems that communicate with each other over the LAN. Of course, the nodes are not limited to communicating over a LAN but can also communicate with each other via a direct connection, a wireless connection, or any other network connection. While this embodiment of the invention depicts the collection of nodes including a coordinator node and a collection of non-coordinator nodes, other embodiments of the invention do not require such an implementation. For example, the nodes can be similarly configured.

The nodes are further coupled via, for example, a storage area network (SAN) (e.g., SAN 135) to enable communication with shared storage device. The shared storage device can be implemented as a cluster shared volume 140. According to one embodiment, cluster shared volume 140 can be implemented as a collection of hard disk drives aggregated to form at least one volume accessible for read and write operations by all nodes in distributed computing system 105.

Also, according to one embodiment, cluster shared volume 140 can be formatted with the New Technology File System (NTFS).

FIG. 1 further illustrates a collection of virtual machines (VMs) 125(1)-(N) supported by nodes 120 and 130(1)-(N). These virtual machines are software implementations of a physical computer that execute computer instructions in the manner of physical computer hardware. Virtual machines 125(1)-(N) read and write data to a collection of virtual hard drives (VHD) 145(1)-(N) allocated on cluster shared volume 145. For example, virtual machine 125(1) reads and writes data to virtual hard drive 145(1). While FIG. 1 illustrates twelve virtual machines and twelve virtual hard drives, embodiments of the invention can support any number of virtual machines and virtual hard drives. During operation of the distributed computing system, some virtual machines can utilize more than one virtual hard drive, and thus some embodiments may implement differing numbers of virtual machines and virtual hard drives.

The virtual hard drives can be implemented as virtual hard drive files. A virtual hard drive file is similar to a normal file on the cluster shared volume 140. However, the difference is that the virtual hard drive file can be accessed by non-coordinator nodes (e.g., non-coordinator nodes 130(1)-(N)) via direct I/O, which is discussed herein in more detail below. A normal file on cluster shared volume 140 must be accessed via redirected I/O (discussed herein in more detail below) by a non-coordinator node. The coordinator node (e.g., coordinator node 120) allocates both normal files and virtual hard drive files in a similar fashion. When both normal files and virtual hard drive files are generated, the files are assigned certain disk blocks of the physical hard disks aggregated to form cluster shared volume 140. In the above example, virtual machine 125(1) reads and writes data to hard disk drive blocks allocated to form a virtual hard drive file. The virtual hard drive file represents virtual hard drive 145(1) on cluster shared volume 140.

Accessing the Cluster Shared Volume: Coordinator Node Vs. Non-Coordinator Nodes

According to an embodiment of the invention, cluster shared volume 140 is formatted using a file system that enables a single host, designated as the coordinator node (e.g., coordinator node 120) to modify the file system structures or metadata. An example of such a file system is NTFS. If the other nodes (e.g., non-coordinator nodes 130 (1)-(N)) require modification of the file system structures or metadata, the non-coordinator node must send a request to the coordinator node via LAN 110. Then, in response to the request, the coordinator node modifies the file system structures or metadata requested by the non-coordinator node. After modifying the file system structures or metadata according to the request, the coordinator node sends a confirmation message to the non-coordinator node.

An example of a file system structure or metadata modification request is a request from a non-coordinator node to change the allocation of hard disk drive blocks that form a virtual hard drive file. The hard disk drive blocks allocated to a particular virtual hard drive file can be increased (to increase the storage capacity of the virtual hard drive file) or decreased (to decrease the storage capacity of the virtual hard drive file).

Direct I/O Vs. Redirected I/O

To improve distributed computing system performance, each non-coordinator node requests exclusive access to certain regions of the cluster shared volume. The non-coordinator nodes send the requests for exclusive access to the coordinator node, which grants the requests. The regions of the cluster shared volume requested by the non-coordinator nodes correspond to the virtual hard drive files accessed by the virtual machines implemented by the non-coordinator nodes. Once the request is granted, the non-coordinator nodes can access their requested regions of the cluster shared volume directly (referred to as "direct I/O") without first sending access requests to the coordinator node.

For example, referring back to FIG. 1, non-coordinator node 130(1) supports three virtual machines: virtual machines 125(4)-(6). Virtual machines 125(4)-(6) read and write data to virtual hard drives 145(4)-(6), respectively. Once coordinator node 120 grants non-coordinator node 130(1) exclusive access to the regions on cluster shared volume 140 corresponding to virtual hard drives 145(4)-(6), virtual machines 125(4)-(6) can access those regions using direct I/O (through non-coordinator node 130(1)).

On the other hand, other applications executing on a non-coordinator node accesses the cluster shared volume using "redirected I/O." Redirected I/O involves the non-coordinator node first sending a request through the LAN to the coordinator node. If the request is a read request, the coordinator node reads the requested data and returns the requested data via the LAN to the non-coordinator node. If the request is a write request, the non-coordinator node sends the data to be written with the write request via the LAN to the coordinator node. In response to receiving the write request and the data to be written, the coordinator node writes the data to the appropriate data locations on the cluster shared volume and sends back a completion status to the non-coordinator node via the LAN. At times, such as when a snapshot is being created or maintained, the coordinator node can restrict direct I/O by the non-coordinator nodes, which forces the non-coordinator nodes to use redirected I/O for all I/O to the shared storage device, even for access to virtual disk drives allocated to virtual machines running on those nodes.

During normal operation, one example of redirected I/O involves a virtual machine's I/O request to write to a virtual block that has not been previously accessed by the virtual machine. This type of request must first go through the LAN to the coordinator node. Space for this new virtual block must be allocated by increasing the size of the virtual hard drive associated with the virtual machine. The non-coordinator node first sends the allocation request through the LAN to the coordinator node. Then, the coordinator node allocates the requested virtual block to the virtual hard drive and updates the associated NTFS structures on the cluster shared volume. The coordinator node then notifies the non-coordination node executing the virtual machine that the storage capacity of the virtual hard drive has been increased. The virtual machine then completes the write request, using direct I/O.

According to one embodiment, a block used for I/O purposes can be of various sizes. For instance, many file system I/O reads and writes blocks that are a multiple of a cluster size. In the case of NTFS, the cluster size is 4 K.

Coordinator Node

Figure 2A:
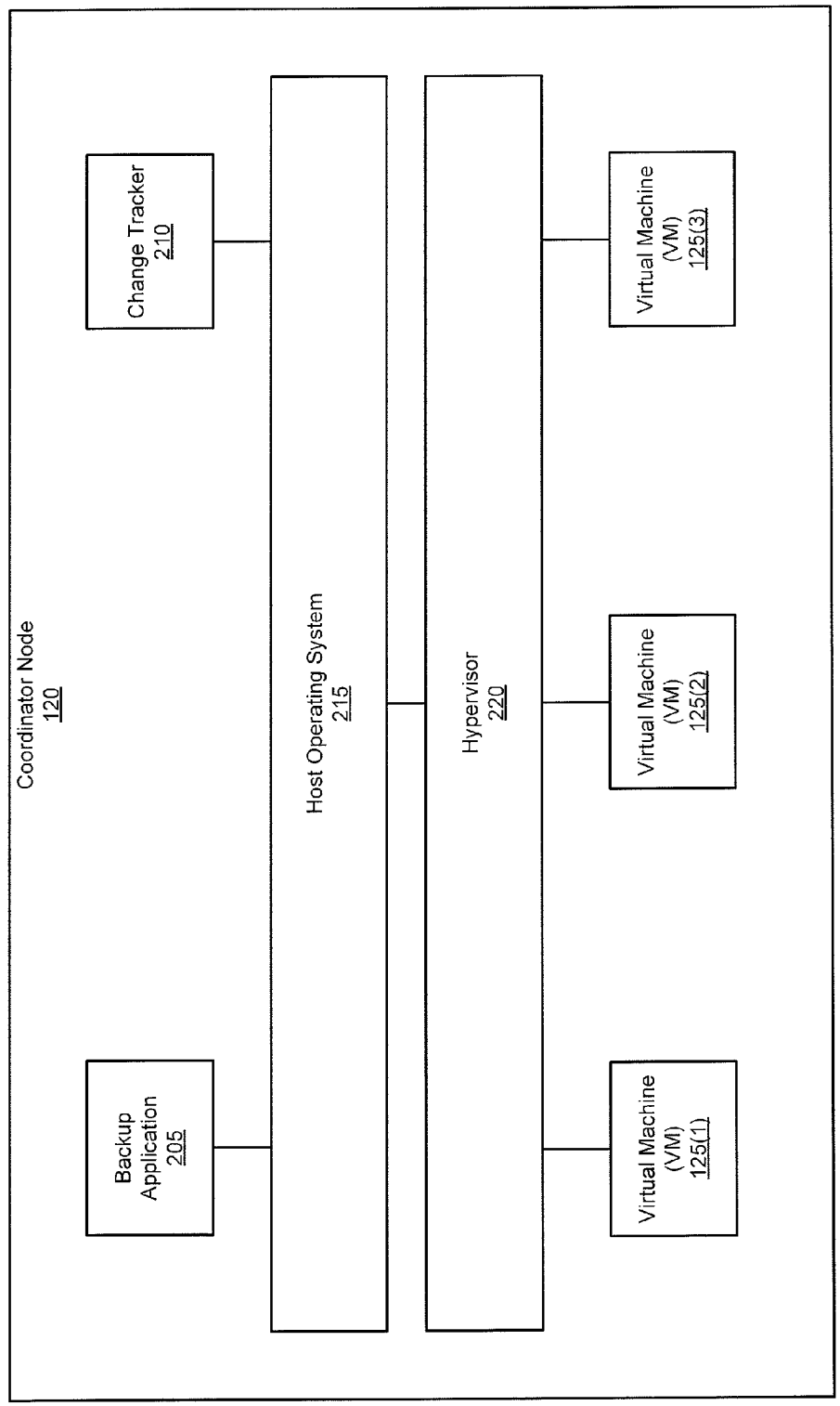
FIG. 2A is a block diagram illustrating a coordinator node, according to one embodiment.

FIG. 2A is a block diagram illustrating a coordinator node (e.g., coordinator node 120 of FIG. 1), according to one embodiment. As illustrated, coordinator node 120 includes a backup application 205, a change tracker 210, a host operating system 215, a hypervisor 220, and virtual machines 125(1)-(3), all of which are discussed herein in more detail.

Host operating system 215 is the operating system that underlies backup application 205, change tracker 210, and hypervisor 220. As previously discussed, backup application 205 periodically generates snapshots and backups using those snapshots. According to one embodiment, backup application 205 initiates snapshots by sending a request to the coordinator node. The coordinator node sends messages to the other nodes in the distributed computing system to prepare for a snapshot of the clustered shared volume. Backup application 205 periodically generates snapshots of the data stored in the cluster shared volume. A snapshot is a point-in-time copy of the data stored on the cluster shared volume at a particular time. For example, a snapshot of the data stored on the cluster shared volume at time $T_1$ shows version A of the data. A snapshot taken at a later time ($T_2$) shows version B of the data, where version B includes all of the completed changes to the data made since time $T_1$.

According to embodiments of the invention, the snapshots can be implemented as non-modifiable snapshots or modifiable snapshots. A non-modifiable snapshot is a view of a data stored on the cluster shared volume that cannot be modified after the non-modifiable snapshot is taken. Thus, when implementing non-modifiable snapshots, all changes (generated by applications and operating systems executing on the distributed computing system) to data must be completed and sent to the cluster shared volume before the snapshot can be taken.

Other embodiments implement modifiable snapshots, which allow the snapshots to be modified after generation. After a modifiable snapshot is created, the modified snapshot is presented as a separated volume on the cluster shared volume. Each node accesses the virtual hard disk files corresponding to the virtual machines supported by that node. The virtual hard disk files are presented as separate virtual snapshot volumes for the corresponding virtual machines. Applications executing in the virtual machines can make modifications to the files in the virtual snapshot volumes, which result in changes to the virtual hard disk files of the virtual snapshot volume. Applications within the virtual machines can write to the virtual snapshot volumes to modify or truncate log files or perform actions that place the virtual disk files in a clean state. Other applications executing outside of the virtual machines on each node of the distributed computing system can also perform similar actions to other files on the snapshot of the cluster shared volume. After all the applications notify their respective virtual machines that the applications do not have any further modifications to make to the data in the virtual snapshot volumes, and the other applications running on the various nodes notify the coordinator node that they have no more changes to make to other files on the snapshot of the cluster shared volume, the modifiable snapshot is placed into a read-only state. One or more change trackers track all the changes (on one or more local change lists) made to the modifiable snapshot. These change trackers or the backup application merge each of these local change lists into each of two respective local change lists. These local change lists include a local change list of all changes that occurred before the snapshot was taken and to a new local change list of all changes that occurred after the snapshot was taken. Alternatively, these local change lists (listing changes made after the modifiable snapshot is taken and before the modifiable snapshot is placed in a read-only state) can be merged into one or more composite change lists.

Once the snapshot is taken, backup application 205 can make a copy of the snapshot to generate a full or incremental backup. The backups generated by backup application 205 can include full backups or incremental backups. A full backup is a backup of all the data stored on the cluster shared volume. According to some embodiments, a full backup can include all of the data stored on the cluster shared volume, with the exception of some data excluded by a user or system administrator. The user or the backup application can exclude certain data like local change lists stored in the cluster shared volume, which do not require backup. An incremental backup is a backup of data stored on the cluster shared volume that has been modified since a preceding backup. The preceding backup can be a full backup or an incremental backup. A process used by the backup application to perform backups of the data stored on the cluster shared volume will be discussed in detail in conjunction with FIGS. 4-5.

Change tracker 210 keeps track of changes to data made to the cluster shared volume by the coordination node on behalf of virtual machines 125(1)-(3) or via redirected I/O on behalf of the non-coordination nodes 130(1)-(N). The changes to data are recorded by change tracker 210 in a local change list (discussed herein in more detail in conjunction with FIG. 3). Hypervisor 220 is software and/or hardware that provides coordinator node 120 the ability to concurrently support virtual machines 125(1)-(3) (also discussed herein in more detail). Hypervisor 220 provides such ability by coordinating the distribution of computer resources (e.g., processing power, memory, etc.) among virtual machines 125(1)-(3) so that virtual machines 125(1)-(3) operate similarly to physical computers. Hypervisor 220 and virtual machines 125(1)-(3) are discussed herein in greater detail.

Non-Coordinator Node

Figure 2B:
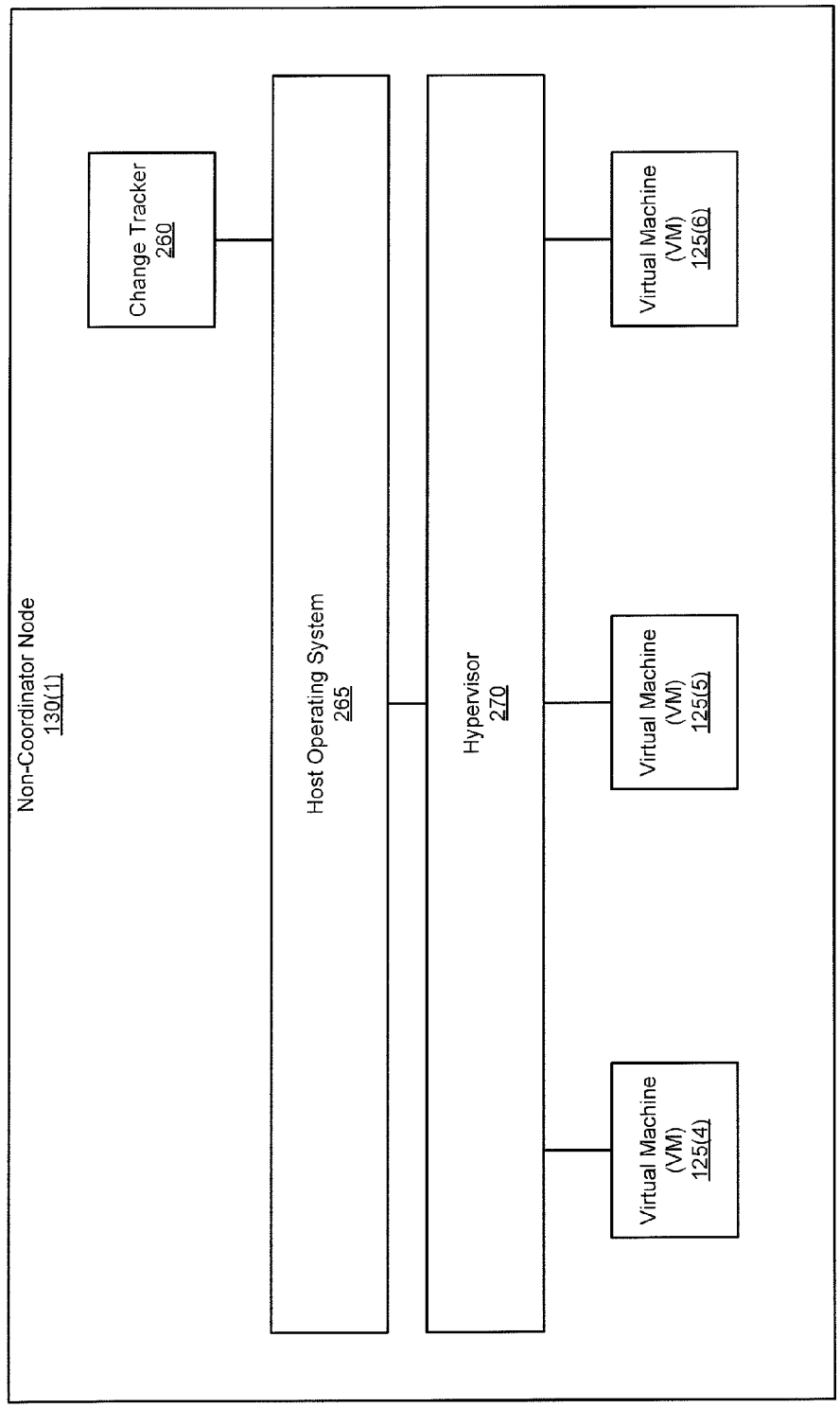
FIG. 2B is a block diagram illustrating a non-coordinator node, according to one embodiment.

FIG. 2B is a block diagram illustrating a non-coordinator node (e.g., non-coordinator node 130(1)), according to one embodiment. As illustrated, non-coordinator node 130(1) includes a change tracker 260, a host operating system 265, a hypervisor 270, and virtual machines 125(4)-(6), all of which are discussed herein in more detail. Non-coordinator nodes 130(2)-(N) include similarly-configured components as non-coordinator node 130(1).

Host operating system 265 is the operating system that underlies change tracker 260 and hypervisor 270. Change tracker 260 keeps track of changes to data made to the cluster shared volume by non-coordination node 130(1) on behalf of virtual machines 125(4)-(6). The changes to data are recorded by change tracker 260 in a local change list (discussed herein in more detail in conjunction with FIG. 3).

Hypervisor 270 (discussed herein in more detail) is software and/or hardware that provides non-coordinator node 130(1) the ability to concurrently support virtual machines 125(4)-(6) (also discussed herein in more detail). Hypervisor 270 provides such ability by coordinating the distribution of computer resources (e.g., processing power, memory, etc.) among virtual machines 125(4)-(6) so that virtual machines 125(4)-(6) operate similarly to physical computers. Hypervisor 270 and virtual machines 125(4)-(6) are discussed herein in greater detail.

Virtual Machines

Virtual machines (e.g., virtual machines 125(1)-(N) of FIG. 1) are implemented in software and execute computer instructions similarly to physical hardware. Most modern computers can operate as host computers for at least one virtual machine. Examples of host computers are coordinator node 120 and non-coordinator nodes 130(1)-(N) (See FIG. 1, FIG. 2A, and FIG. 2B).

A computer system supporting multiple virtual machines typically does so, at least in part, through the use of system software and/or hardware that manages the host computer system's resources in a manner that allows the host computer system to present a hosted virtual environment to each of the virtual machines. In so doing, each virtual machine is able to operate as if the host computer system were solely under its control, and so share the host computer system's resources. For example, the host computer system can include at least one processor and system memory. The aforementioned system software and/or hardware support the sharing of these resources by providing processor resources and memory management to each of the virtual machines. Such virtualization functionality can be provided, for example, through the use of a system virtual machine (sometimes referred to as a hardware virtual machine), which allows sharing of the underlying physical machine resources between different virtual machines, each running its own operating system (OS; which can vary from virtual machine-to-virtual machine, or can be the same OS across all the virtual machines).

However, in order for the virtual machines to successfully co-exist with one another, the system software and/or hardware also needs to be able to coordinate and manage these demands for host computer system resources. For example, if all of the virtual machines supported by a particular host computer request the same resource (e.g., processor, memory, or communication resources, etc.) at the same time, the host computer may become overloaded and will not be able to effectively perform requested tasks. There needs to be a component that acts as a coordinator or manager of these computing resources. A virtualization component (e.g., a software abstraction layer) that is commonly referred to as a "hypervisor" (e.g., hypervisor 220 of FIG. 2A) can provide such coordination of computing resources. The hypervisor supports multiple virtual machines by coordinating processor resources to support the execution of instructions on behalf of the various virtual machines, and performing memory management to help ensure that the virtual machines effectively share the host computer's system memory, for example.

Change Lists

During the operation of a distributed computing system (e.g., distributed computing system 105), the coordinator node and non-coordinator nodes support virtual machines that access and modify data stored in a cluster shared volume. The data is stored within virtual hard drives on the cluster shared volume. In order to generate incremental backups of the data stored on the cluster shared volume, the changes made to the data by the nodes are tracked by change trackers. The changes are tracked to ensure that any modifications made to data since the last backup are properly backed up. According to embodiments of the invention, the change trackers record the changes in change lists.

According to one embodiment, a change list can be implemented as a bitmap or a run-list. In either implementation, the changes are tracked at a block level where a block can correspond to a sector or cluster (e.g., 4K in the case of NTFS), but can also track at a less granular level (e.g., 64K, which corresponds to 128 sectors) to reduce the number of blocks tracked. When implemented as a bitmap, the change list includes one bit for each block tracked. Setting a bit corresponding to a block indicates that that particular block has been modified.

When the change list is implemented as run-list, the run-list includes a set of runs (also referred to as extents). A run includes a starting block number and a count of subsequent blocks that have also been modified. If a block is modified, the run-list is searched to determine if the block is part of a run that is already identified in the run-list. If the block is included in a run that is already identified in the run-list, the run-list is up-to-date. If the block is included immediately after a run in the run-list, the count for the run is incremented by one. If the block is included immediately before a run in the run-list, the start value is decremented by one and the count is incremented. If the block is not included in or adjacent to a run already in the run-list, then a new run of count one is created and added to the run-list.

A separate bitmap or run-list can be maintained for each region of the cluster shared volume. Some embodiments do not require region tracking. A region of the cluster shared volume can be represented with a single bit in a bitmap. Setting a bit in the bitmap indicates that the region represented by that bit has been modified. However, a region can also be implemented with several states, which requires multiple bits to represent each region's state. Some states can include, but are not limited to:

- never modified (no block in this region has ever been modified since tracking began);
- all blocks are modified;
- previously modified (but an on-disk change list (bit map or run-list for the region) is up to date);
- modified (the on-disk change list is out-of-date, but the change list is stored in memory);
- unknown (When the change tracker starts up after a crash, if a the region is marked as modified, then before the crash, some changes occurred to the blocks in this region. However, these lists of changes were not written to disk before the crash and have been lost. It is now unknown which blocks within the region have been modified.). The unknown regions can be reconciled during a next incremental backup.

Figure 3:
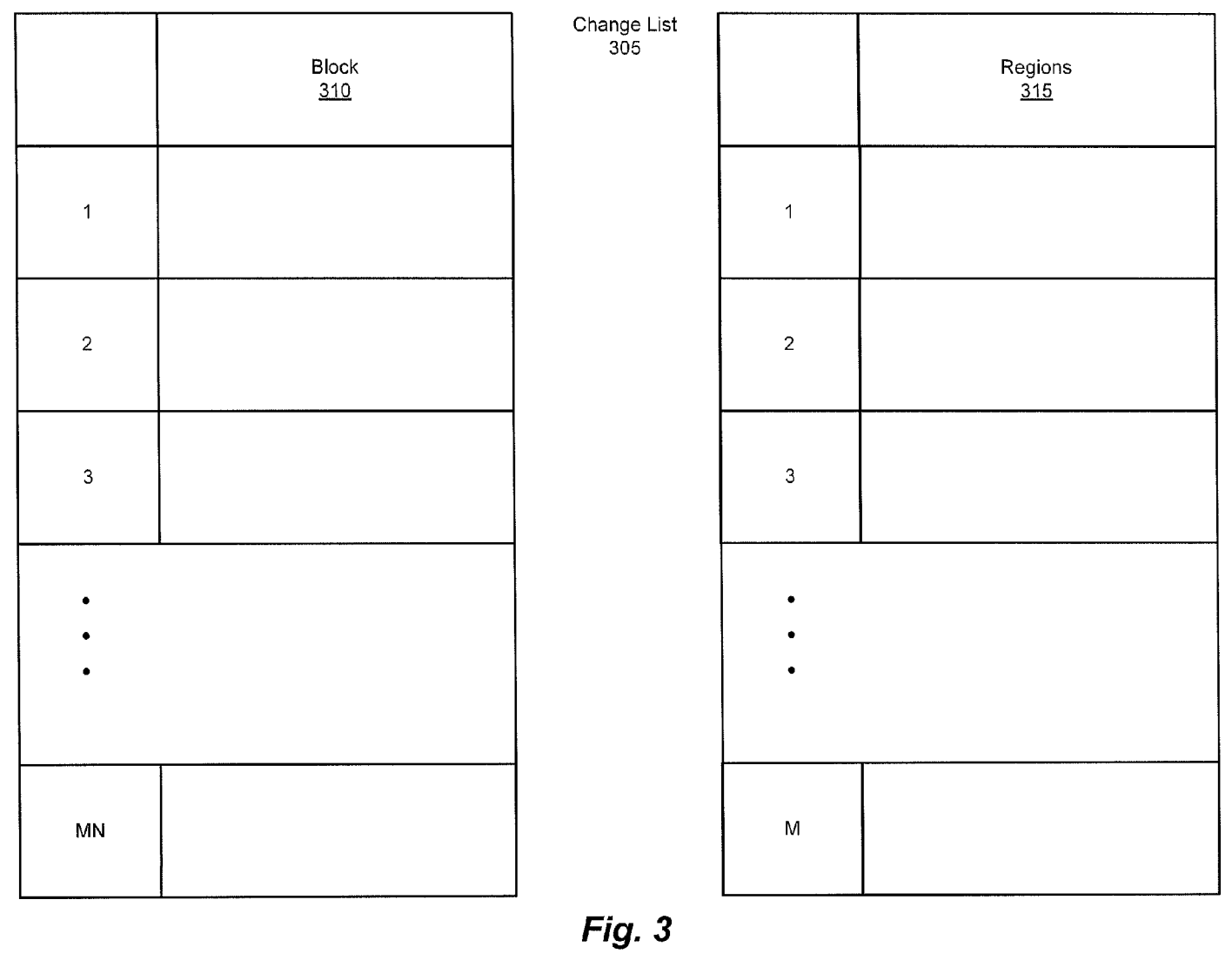

FIG. 3 illustrates a change list (e.g., change list 305) according to one embodiment. The change list includes two columns: block column 310 and region column 315. This change list can be a local change list or a composite change list. Some embodiments of the invention implement at least one local change list and also a composite list, which a backup application assembles from the local change lists. Other embodiments of the invention implement only local change lists or only a composite change list. A change tracker records changes made by a single entity (e.g., a single node or a single virtual machine) on a local change list. A local change list can be stored within the particular entity (e.g., node or virtual machine) and/or within the cluster shared volume.

Change list 305 can also be a composite change list. A composite change list incorporates all of the changes made by all of the nodes or virtual machines in a distributed computing system. For example, the change trackers executing on each node of the distributed computing system can write to different parts (e.g., each part acting as of a local change list) of a shared file (e.g., the entirety of which acts as a composite change list) on the cluster shared volume. Also, all of the non-coordinator nodes can send changes they detect via the LAN to the change tracker executing on the coordinator node. Then, the change tracker executing on the coordinator node can note these changes detected by the non-coordinator nodes in a composite change list maintained by change tracker executing on the coordinator node.

Referring back to FIG. 3, block column 310 tracks disk blocks (of hard disk drives aggregated to form the cluster shared volume) that have been modified since a last snapshot of the cluster shared volume. According to embodiments of the invention, a disk block can represent any disk allocation unit including, but not limited to, a disk sector, disk block, or disk cluster. For example, when a change tracker detects a write operation to a disk block, the change tracker creates within block column 310 an entry corresponding to that disk block. The entry indicates that that disk block has been modified.

As previously discussed, a local change list can be stored within the particular entity (e.g., node or virtual machine) and/or the cluster shared volume. Regardless of where the local change list is stored or maintained (e.g., stored locally on each node, stored on the cluster shared volume by each node, stored on some other shared storage, or stored on the coordinator node as part of a composite change list), the local change list can be out of synchronization with the actual changes made by the node or virtual machine. The reason why a change list can be out of synchronization with the actual changes is because if the on-disk change list had to be updated before every write by any application on the nodes, the performance of the distributed computing system would be greatly reduced. To improve performance, the change tracker maintains the change list in memory, but only occasionally sends the changes stored in memory to disk. While this configuration improves system performance, the on-disk change list may not accurately reflect all changes that occurred, in the event of a system crash or power loss. Thus, the on-disk change list will not identify changes that occurred after the last time the changes stored in memory were sent to the disk, but before the system crash or power loss.

When such out-of-synchronization condition occurs, an incremental backup cannot be performed unless the lost changes can be detected. By comparing each block of the cluster shared volume to the corresponding block of the previous backup, the local change list can be reconciled or brought up to date with the actual changes made. However, such reconciliation is resource intensive.

To reduce the number of blocks to be reconciled after a system crash or a similar event, the cluster shared volume is partitioned into regions. The change list records in region column 315 whether each region of the cluster shared volume includes modified data. Before a node or virtual machine is allowed to write to any block of the cluster shared volume, the change tracker for that node or virtual machine determines if the region has been marked as modified. If the region has not been marked as modified, the change tracker marks the region as modified in the node's local change list before allowing the update to the node's local change list to the cluster shared volume. Often, when one block is written, nearby blocks are written as well. If these nearby blocks are part of the same region, the nearby blocks can be written immediately as the region will already be marked as modified. The immediate write to nearby regions improves the performance of the distributed computing system.

After a period of time, when the frequency of writes to the region has been reduced, the local change list pertaining to the region can be updated on the cluster shared volume. Once the local change list is updated, the region can be marked as unmodified, since the changes pertaining to the region have all been reflected in the change list stored on the cluster shared volume. In the event of a system crash, only regions marked as modified need to be reconciled. Since the number of regions that are marked as modified is relatively small compared to the size of the cluster shared volume, the backup application can also decide to merely include all the blocks from these regions in an incremental backup rather than attempting to reconcile them to determine the blocks that actually changed.

Change list 305 can also be a composite change list that aggregates all of the changes indicated by the local change lists corresponding to the individual nodes. Backup application 205 of FIG. 2A accesses the composite change list in order in order to make an incremental backup of a snapshot.

If each node or virtual machine maintains an individual local change list and several nodes have crashed since the time of the last backup, the local change list(s) for each node will include regions that have been modified before the crash. Thus, the local change list for those regions reflects inaccurate information. The change tracker or backup application handling the composite change list (which is an aggregation of the local change lists) should consider as modified any region that was marked as modified in any of the individual local change lists.

Operation of the Coordinator Node

Figure 4A:
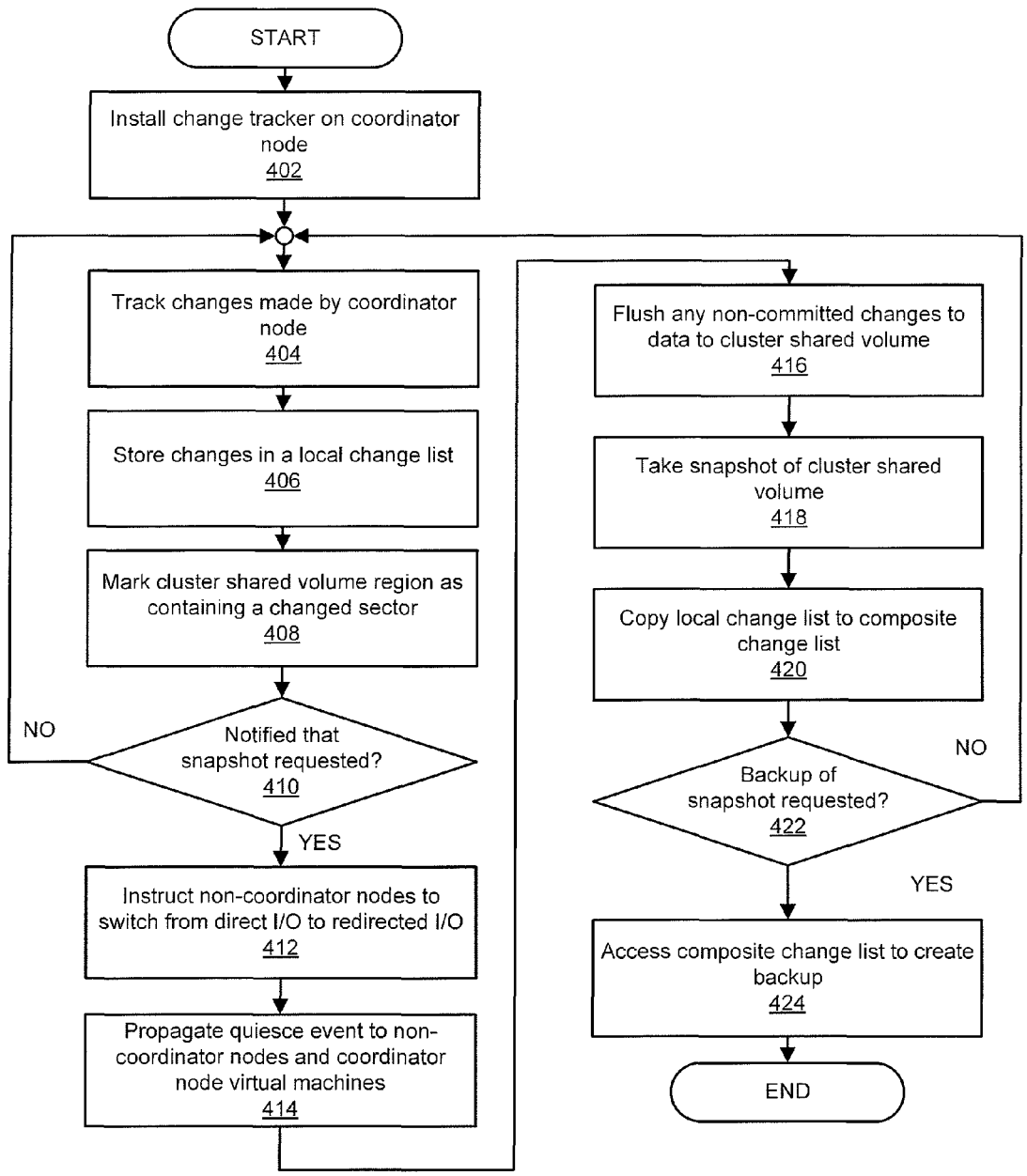
FIG. 4A is a flowchart illustrating a method for managing backups of virtual machines, as performed by a coordinator node, according to one embodiment.

FIG. 4A is a flowchart illustrating a method for managing backups of virtual machines, as performed by a coordinator node, according to one embodiment. The process of FIG. 4A begins with a change tracker being installed (e.g., change tracker 210 of FIG. 2A) on a coordinator node (e.g., coordinator node 120 of FIG. 1 and FIG. 2B) of a distributed computing system (e.g., distributed computing system 105 of FIG. 1), as shown in 402. According to another embodiment, a change tracker can be installed in each virtual machine supported by the coordinator node instead of having a single change tracker installed on the coordinator node.

During the operation of the distributed computing system, the change tracker tracks changes to a portion of the data on a cluster shared volume (e.g., cluster shared volume 140 of FIG. 1), as shown in 404. The changes to data on the cluster shared volume are made by the coordinator node or via redirected I/O requests from a non-coordinator node (e.g., non-coordinator node 130(1) of FIG. 1 and FIG. 2A). The change tracker stores changes to data to a local change list (e.g., change list 305 of FIG. 3).

The changes are marked in the local change list in a variety of ways. The change tracker makes an entry corresponding to the block that includes modified data in the block column (e.g., block column 310 of FIG. 3) of the change list, as shown in 406. Also, as shown in 408, the change tracker notes the region of the cluster shared volume where the change is made. The change tracker determines if that region of the cluster shared volume includes a block that stores modified data. If that particular region does include a block that stores modified data, the change tracker makes an entry corresponding to the region into the region column (e.g., region column 315 of FIG. 3) of the change list. As described herein in conjunction with FIG. 4B, similar change tracking is being performed by the change trackers on the non-coordination nodes.

If the coordinator node receives a notification that a snapshot has been requested (and initiated) by a backup application (e.g., backup application 205 of FIG. 2A) (410), the coordinator node sends instructions to the non-coordinator nodes to access the cluster shared volume using redirected I/O instead of direct I/O, as shown in 412. Once the non-coordinator nodes have switched from direct I/O to redirected I/O, the coordinator node propagates a quiesce event to the non-coordinator nodes and the virtual machines supported by the coordinator node, as shown in 414. As previously discussed, the quiesce event pauses the write operations of a node and/or virtual machine to the shared storage device in order to allow the backup application to generate a consistent snapshot.

During normal operations of the distributed computing system, changes to data are sometimes first written to local memory and then later sent to the cluster shared volume. This two-step process increases the performance of the distributed computing system by enabling the nodes to continue processing tasks instead of waiting for the changes to propagate to the cluster shared volume. However, once a backup application (e.g., backup application 205 of FIG. 2A) requests a snapshot, a consistent representation of the cluster shared volume includes all changes to data, including the changes stored in local memory of the nodes, but have not yet been propagated to the cluster shared volume. Thus, at this time, the coordinator node sends any locally-stored changes to the data to the cluster shared volume, as shown in 416.

Once all changes have been sent to the cluster shared volume and the quiesce events have been propagated, the backup application takes a snapshot of the cluster shared volume, as shown in 418. Once the change tracker determines that a snapshot has been taken by the backup application, the change tracker discontinues the current change list and starts a new change list. The change tracker uses the new change list to track changes that occur after the snapshot. Alternatively, the change tracker can place a marker in the current change list to separate the changes occurring before the snapshot from the changes occurring after the snapshot. The backup application accesses the local change list, which includes the list of changes that occurred between the snapshot taken for the prior backup and the just-completed snapshot that will be used for a current backup, and merges the local change list with the corresponding change lists from the other nodes to create a composite change list that can be stored on the cluster shared volume, as shown in 420. The composite change list includes changes to data made by all nodes in the distributed computing system since a last backup operation. If the change tracking lists are bitmaps, the backup application will simply OR all of the bitmaps together to generate the composite change list. According to one embodiment, the composite change list can include indicators that track the origin (e.g., generated by a particular node or virtual machine) of each change, as obtained from the local change list the change originated. The indicators can be used to generate backups of the changes made by a particular entity (e.g., a particular node or virtual machine).

The backup application then determines if a backup of the last snapshot has been requested. If a backup of the last snapshot has been requested, the backup application accesses the composite change list to create the backup from the snapshot, discussed herein in more detail in conjunction with FIG. 4C.

Operation of the Non-Coordinator Nodes

Figure 4B:
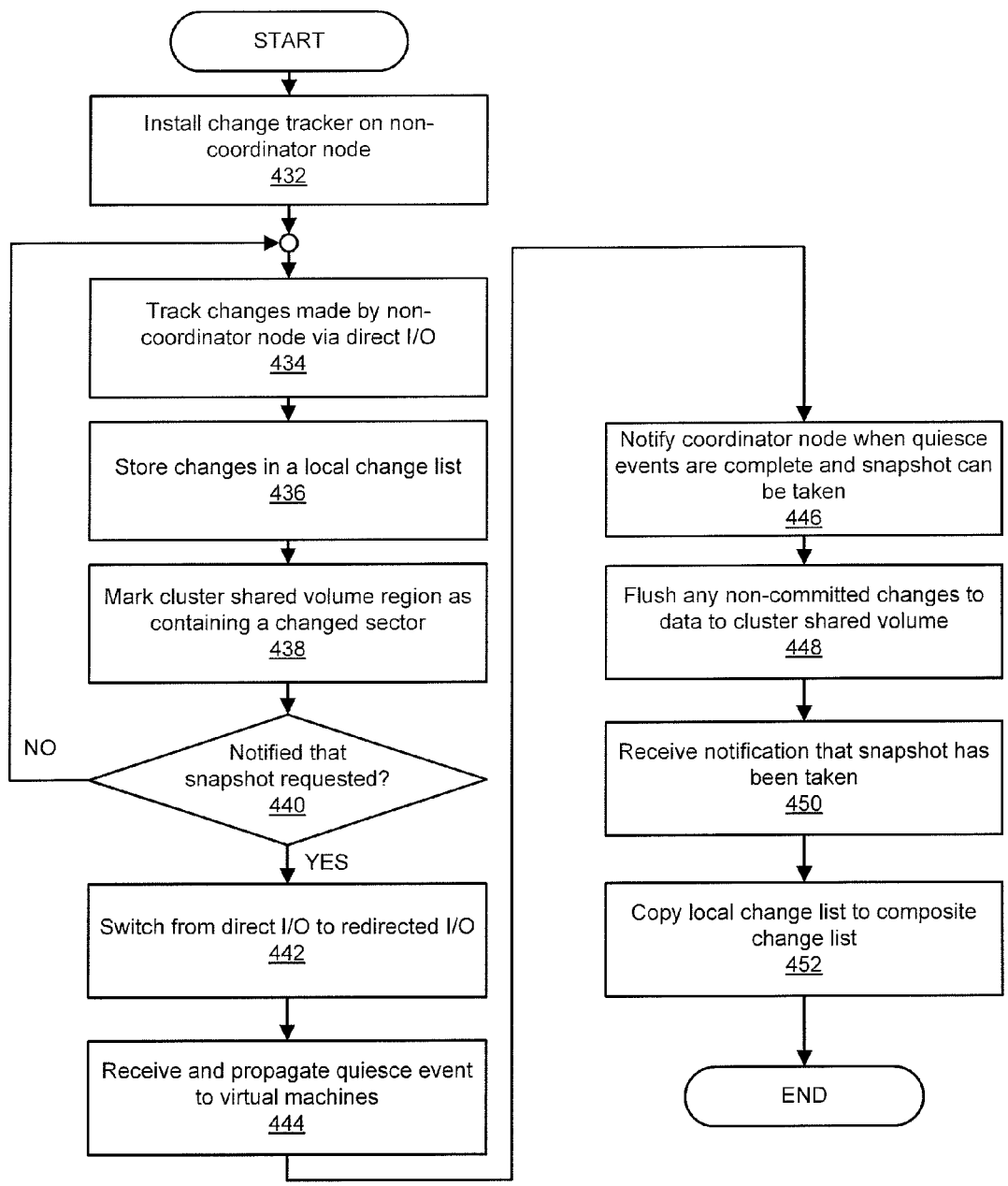
FIG. 4B is a flowchart illustrating a method for managing backups of virtual machines, as performed by a non-coordinator node, according to one embodiment.

FIG. 4B is a flowchart illustrating a method for tracking changes, as performed by a non-coordinator node, according to one embodiment. The process of FIG. 4B begins with a system administrator or user installing a change tracker (e.g., change tracker 260 of FIG. 2B) on a non-coordinator node (e.g., non-coordinator node 120 of FIG. 1 and FIG. 2B) of a distributed computing system (e.g., distributed computing system 105 of FIG. 1), as shown in 432. According to embodiments of the invention, the change tracker can also be installed in each virtual machine supported by the non-coordinator node. During the operation of the distributed computing system, the change tracker tracks changes to data on a cluster shared volume (e.g., cluster shared volume 140 of FIG. 1), as shown in 434. The changes to data on the cluster shared volume are made by the non-coordinator node (e.g., non-coordinator node 130(1) of FIG. 1 and FIG. 2B). The change tracker stores changes to data to a local change list (e.g., change list 305 of FIG. 3).

The changes are marked in the local change list in a variety of ways. The change tracker makes an entry corresponding to the block that includes modified data in the block column (e.g., block column 310 of FIG. 3) of the change list, as shown in 436. Also, as shown in 438, the change tracker notes the region of the cluster shared volume the change is made. The change tracker determines if that region of the cluster shared volume includes a block that stores modified data. If that particular region does include a block that stores modified data, the change tracker makes an entry corresponding to the region into the region column (e.g., region column 315 of FIG. 3) of the change list.

If a backup application (e.g., backup application 205 of FIG. 2A) (440) requests a snapshot, the non-coordinator node receives notification from the coordinator node to access the cluster shared volume using redirected I/O instead of direct I/O, as shown in 442. The change tracker implemented on the non-coordinator node can also be notified that a snapshot is pending, so that the change tracker can prepare to transition from a current change list to a new change list that tracks changes after the snapshot is taken.

The non-coordinator node then receives and propagates quiesce events received from the coordinator node to the virtual machines supported by the non-coordinator nodes, as shown in 444. Once the quiesce events are complete, the non-coordinator nodes notify the coordinator node of the completion so that the backup application on the coordinator node can take the snapshot of the cluster shared volume, as shown in 446.

During normal operations of the distributed computing system, changes to data are sometimes first written to local memory and then later sent to the cluster shared volume. This two-step process increases the performance of the distributed computing system by enabling the nodes to continue processing tasks instead of waiting for the changes to propagate to the cluster shared volume. However, once a backup application (e.g., backup application 205 of FIG. 2A) requests a snapshot, a consistent representation of the cluster shared volume includes all change to data, including the changes stored in local memory of the nodes. If there are any changes to data that have not yet been propagated to the cluster shared volume, the non-coordinator node then sends any such changes to the data to the cluster shared volume, as shown in 448. These changes to the data are sent before the snapshot is taken. Once the changes to data are sent to the cluster shared volume, the snapshot is taken. The non-coordinator node receives an indication that the snapshot has been taken, as shown in 450.

The backup application (on the coordinator node) copies the local change list to a composite change list stored on the cluster shared volume, as shown in 452. According to one embodiment where the local change lists are stored on the cluster shared volume, the backup application accesses each local change list and merges the local change lists into a composite change list. The composite change list includes changes to data made by all nodes in the distributed computing system since a last backup operation.

Figure 4C:
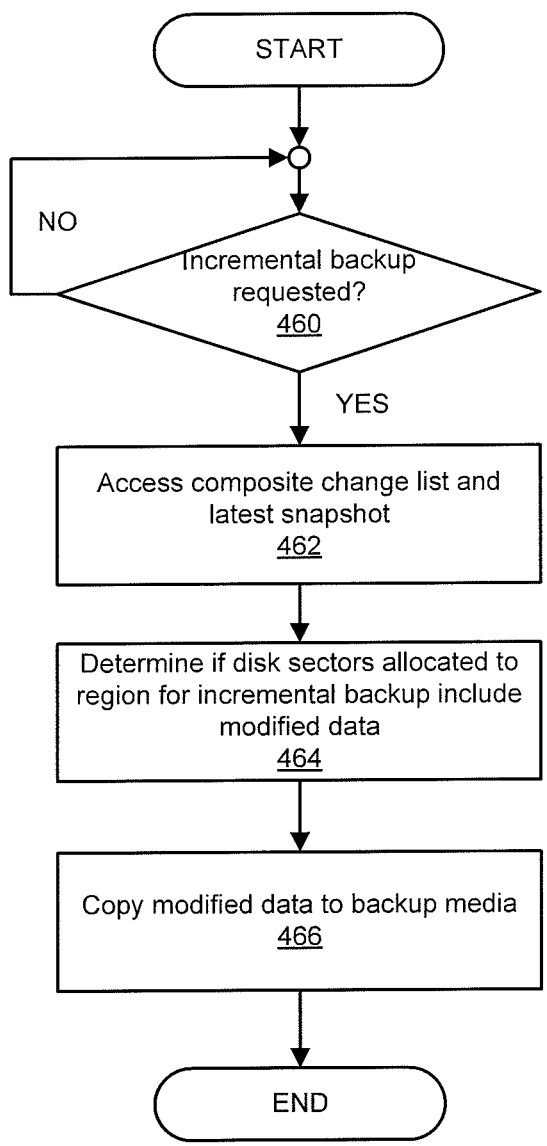
FIG. 4C is a flowchart illustrating a method for backing up data stored on a cluster shared volume, as performed by a backup application, according to one embodiment.

FIG. 4C is a flowchart illustrating a method of backing up data on a cluster shared volume, as performed by a backup application, according to one embodiment. Generally, the backup application generates a backup by copying all blocks and regions identified in the composite change list as modified from the cluster shared volume to backup media. The backup media can be implemented as a secondary storage device (e.g., internal or external hard drive or network storage) or other kinds of storage media (e.g., tape, optical disks, etc.). The generated backup can take a variety of forms. For example, the backup can be a full backup of all the data stored on the cluster shared volume. The backup can be an incremental backup that backs up only data on the cluster shared volume modified since the last backup.

The generated backup can also be a full or partial backup of the entire cluster shared volume or a full or partial backup of parts of the cluster shared volume. For example, the backup application can generate a full or partial backup of a region of the cluster shared volume such as a particular file. In response to receiving a request for an incremental backup of a file on the cluster shared volume (460), the backup application generates an incremental backup from a snapshot of the particular file by comparing the disk blocks allocated to the file to the composite change list, as shown in 462. For example, disk blocks 0-10 are allocated to a file. The backup application accesses the composite change list to determine if there are entries associated with blocks 0-10 that indicate any of those blocks include modified data, as shown in 464. If any of blocks 0-10 include modified data, the backup application copies the data from those modified blocks to backup media, as shown in 466. The comparison can be accomplished by ANDing the extents of the file with the composite change list (implemented as a bitmap), and then mapping those comparisons back to the corresponding blocks in the file. By performing an incremental backup in this manner, the incremental backup will capture only those blocks identified as changed in the file.

According to an embodiment, the method outlined in FIG. 4C can include mapping changes to the virtual blocks included in a virtual hard disk file corresponding to a virtual hard drive on the cluster shared volume. The resulting virtual change list is identical to the change list that would have been generated had the change tracker been executing from within a virtual machine associated with the virtual hard disk. The backup application can handle the virtual hard disk in the manner of a physical hard disk and generate incremental backups of the volumes within the virtual hard disk. The incremental backups of the virtual hard disks can exclude changes made to metadata sections of the virtual hard disk (i.e., some blocks in the virtual hard disk do not include virtual blocks, but information about the allocation of virtual blocks).

According to another embodiment of the invention, a change tracker could alternatively be installed in each virtual machine. If a change tracking is installed driver in each virtual machine, this change tracking driver identifies the quiesce event that comes through when the cluster shared volume performs a snapshot. The backup application running on the coordination node queries a service running in each virtual machine to get the list of changes (as a run-list or bitmap). If the change tracking driver saved this list to disk (in the virtual snapshot virtual hard drive) as part of the quiesce, then the backup application accesses this change list directly from the snapped virtual hard drive without needing to contact a service in each virtual machine.

An Example Computing Environment

Elements of network architecture can be implemented using different computer systems and networks. An example of one such network environment is described below with reference to FIG. 5.

Figure 5:
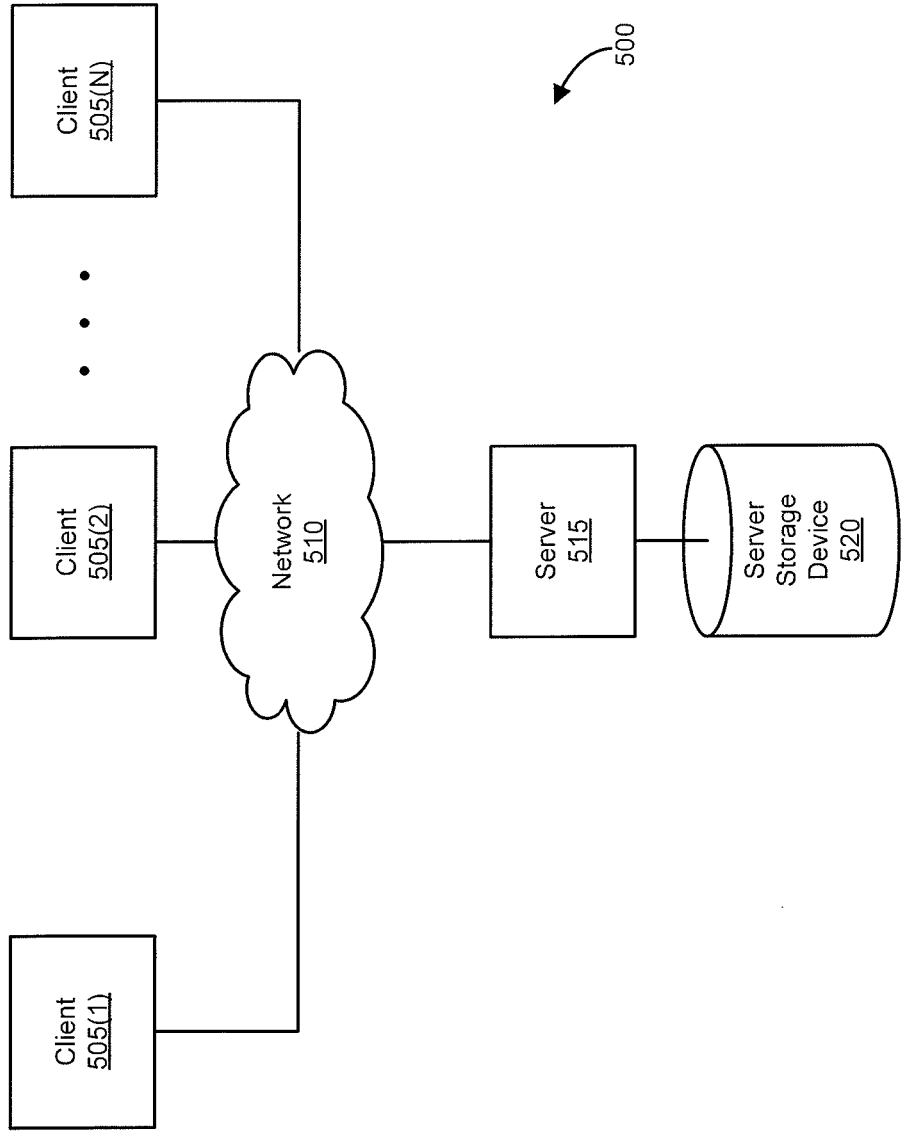
FIG. 5 is a block diagram illustrating a network architecture in which an embodiment of the present invention can be implemented.

FIG. 5 is a simplified block diagram illustrating a network architecture 500 in which one or more clients are provided with access to a server via various network connections. As depicted in FIG. 5, clients 505(1)-(N) are coupled to a network 510, and so are able to access a server 515 (which can be used to implement one of coordinator node 120 and non-coordinator nodes 130(1)-(N) of FIG. 1) via network 510. Other servers (not shown) can be used to implement other nodes among coordinator node 120 and non-coordinator nodes 130(1)-(N). A client can be implemented using, for example, a desktop computer, a laptop computer, a workstation, a server, a cell phone, a smart phone, a network-enabled personal digital assistant (PDA), or the like. An example of network 510, which can be used by clients 505(1)-505(N) to access server 515, is the Internet. Alternatively, access to server 515 can be provided by a local area network (LAN) utilizing Ethernet, IEEE 802.11x, or some other communications protocol. As will be appreciated, server 515 can be accessed by clients coupled directly thereto (not shown).

As also depicted on FIG. 5, server 515 is coupled to a server storage device 520, which includes a data volume such as cluster shared volume 140 of FIG. 1. Server storage device 520 can be implemented as a single storage device or a collection of storage devices. Server storage device 520 can also be implemented as a storage area network, which couples remote storage devices to a server (e.g., server 515), such that the remote storage devices appear as locally-attached storage devices to the server's OS, for example.

In light of the present disclosure, those of skill in the art will appreciate that server storage device 520 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 500 can include other components such as routers, firewalls and the like that are not germane to the discussion of the present network and will not be discussed further herein. Those of skill in the art will also appreciate that other configurations are possible. For example, clients 505(1)-(N) can be directly coupled to server storage device 520 without the user of a server or Internet; server 515 can be used to implement both the clients and the server; network architecture 500 can be implemented without the use of clients 505(1)-(N); and so on.

As an example implementation of network architecture 500, server 515 (implemented with a node among coordinator node 120 and non-coordinator nodes 130(1)-(N)) services requests to data generated by clients 505(1)-(N) to data stored in server storage device 520 (implemented with cluster shared volume 140). Other servers (not depicted) can be implemented with other nodes among coordinator node 120 and non-coordinator nodes 130(1)-(N). Virtual machines (e.g., virtual machines 125(1)-(N) of FIG. 1) implemented on coordinator node 120 and non-coordinator nodes 130(1)-(N) can be used to service these requests by reading and writing data to and from virtual hard drives 145(1)-(N) on cluster shared volume 140. A backup application (e.g., backup application 205 on FIG. 2) can be implemented on coordinator node 120 to generate full or incremental backups from snapshots in the manner described in FIGS. 4A, 4B, and 4C.

Figure 6:
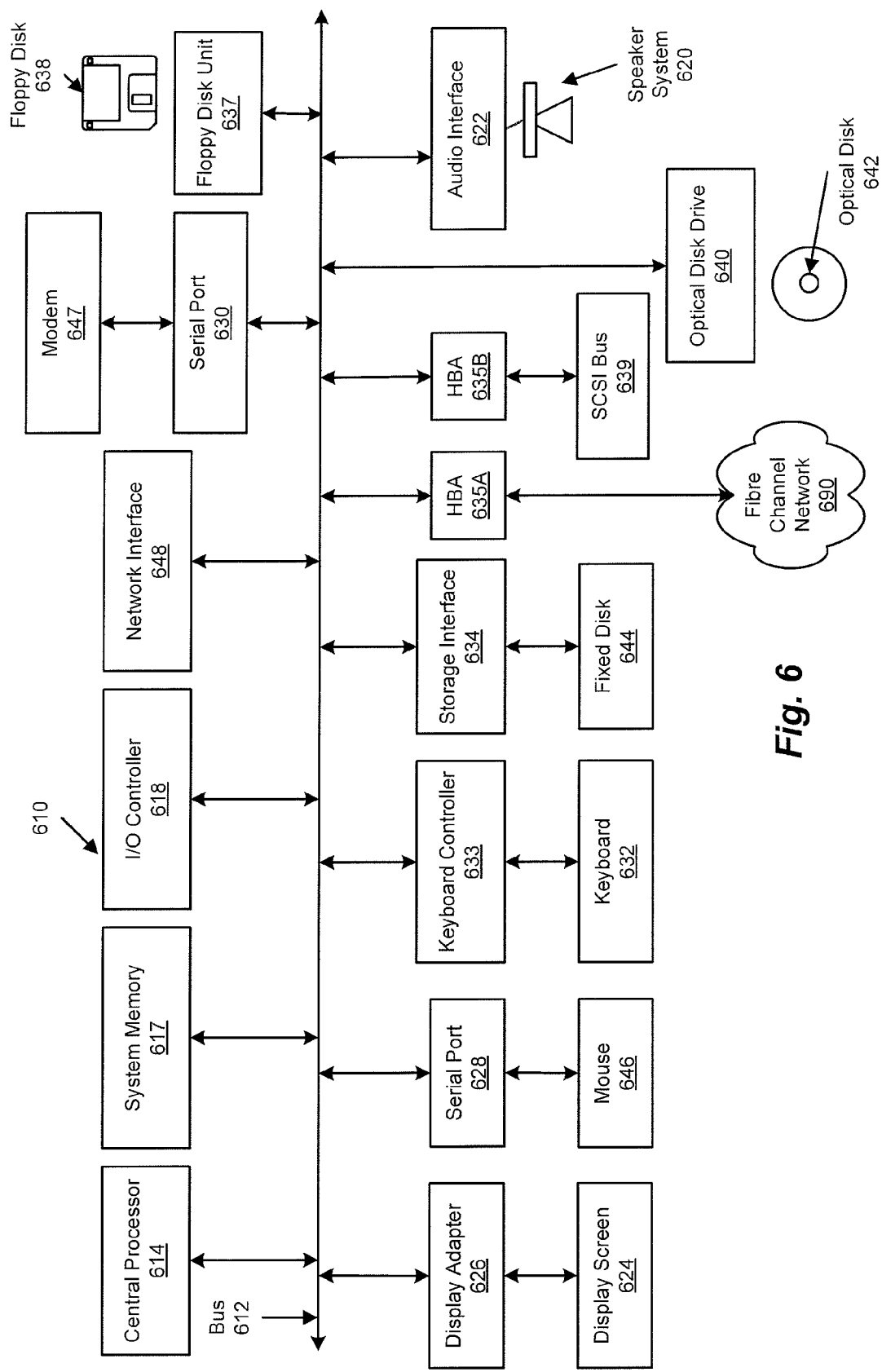
FIG. 6 is a block diagram that illustrates an example of a computer system suitable for implementing embodiments of the present invention.

FIG. 6 depicts a block diagram of a computer system 610 suitable for implementing a server (e.g., coordinator node 120 and non-coordinator nodes 130(1)-(N) of FIG. 1), as well as the clients (e.g., clients 505(1)-505(N) of FIG. 5) used therein. Computer system 610 includes a bus 612, which interconnects major subsystems of computer system 610, such as a central processor 614, a system memory 617 (typically random-access memory (RAM), but which may also include read-only memory (ROM), flash ROM, or the like), an input/output controller 618, an external audio device, such as speaker system 620 via an audio output interface 622, an external device, such as a display screen 624 via display adapter 626, serial ports 628 and 630, a keyboard 632 (interfaced with keyboard controller 633), a storage interface 634, a floppy disk drive 637 operative to receive a floppy disk 638, a host bus adapter (HBA) interface card 635A operative to connect with a Fibre Channel network 690, a host bust adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown) and random access memory (RAM) (not shown), as previously noted. RAM is generally the main memory into which OS and application programs are loaded. ROM or flash memory can contain, among other code, the Basic Input-Output system (BIOS) which controls basic hardware operation such as the interaction with peripheral components. Applications resident with computer system 610 are generally stored on and accessed via a computer-readable storage medium, such as hard disk drive (e.g., fixed disk 644), an optical drive (e.g., optical drive 640), a floppy disk unit 637, or other computer-readable storage media.

Storage interface 634, as with other storage interfaces of computer system 610, can connect to a standard computer-readable storage medium for storage and/or retrieval of information, such as a fixed disk drive 644. Fixed disk drive 644 may be a part of computer system 610, or may be separate and accessed through other interface systems. Modem 647 can be employed to provide a direct connection to a remote server via a telephone link or to the Internet via an Internet service provider (ISP). Network interface 648 may provide a direct connection to a remote server via a direct network link to the Internet via a point-of-presence (POP). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras, and so on). Conversely, all of the devices shown in FIG. 6 need not be present. The devices and subsystems can be interconnected in different ways from that shown in FIG. 6. The operation of the computer system such as that shown in FIG. 6 is readily known in the art and is not discussed in detail in this application. Code to implement the previously-described features can be stored in computer-readable storage media such as one or more of system memory 617, fixed disk 644, optical disk 642, or floppy disk 638. The OS provided on computer system 610 can be, for example, MS-DOS®, MS-WINDOWS®, OS/2®, UNIX®, Linux®, or other known OS.

As an example implementation of computer system 610, coordinator node 120 can store backup application 205, change tracker 210, host operating system 215, hypervisor 220, and virtual machines 125(1)-(3), all of FIG. 2A, in computer-readable storage media (e.g., memory 617 and the like). Also, network interface 648 may be used by any of the modules described in coordinator node 120 and non-coordinator nodes 130(1)-(N). For example, backup application 205 can send and receive notifications concerning functions called within coordinator node 120 or in other parts of a network, as indicated in FIG. 6.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signals is transmitted between the blocks. To some extent, a signal input at a second block may be conceptualized as a second signal derived from a first signal output from a first block due to the physical limitations of the circuitry involved (e.g., there will inevitably be some attenuation and delay). Therefore, as used herein, a second signal derived from the first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   initiating a snapshot of a storage volume, wherein
      a plurality of virtual machines access a plurality of virtual hard disk drives, and
      the plurality of virtual hard disk drives is stored on the storage volume;
   accessing at least a first list of a plurality of lists of a plurality of changes to data, wherein
      the data is stored in the plurality of virtual hard disk drives,
      a first virtual machine of the plurality of virtual machines comprises a first change tracker,
      the first list among the plurality of lists is generated by the first change tracker,
      the first change tracker tracks first changes to the data made by the first virtual machine,
      the first list comprises the first changes,
      the plurality of changes to the data comprises the first changes, the first virtual machine accesses a first virtual hard disk drive among the plurality of virtual hard disk drives,
      the plurality of changes to the data is made by the plurality of virtual machines, and
      the plurality of changes to the data is made subsequent to generation of a prior backup;
   generating an incremental backup of the first virtual hard disk drive, wherein
      the generating comprises copying first data from the snapshot in response to the first list identifying that the data changed subsequent to the generating the prior backup, wherein
         the data is changed by the first virtual machine; and
   the initiating, the accessing, and the generating are performed by a computing device implementing a backup application.

2. The method of claim 1, wherein
   the plurality of lists of the plurality of changes to data is generated by a plurality of change trackers,
   the plurality of change trackers comprise the first change tracker,
   change trackers of the plurality of change trackers are implemented by respective virtual machines of the plurality of virtual machines.

3. The method of claim 1, further comprising:
   communicating at least the first list to the backup application, wherein
      the communicating is performed by a communication module implemented by the first virtual machine.

4. The method of claim 1, wherein
   a plurality of nodes implements the plurality of virtual machines, and
   the plurality of lists is stored by the plurality of virtual hard disk drives.

5. The method of claim 4, wherein the plurality of nodes comprises:
   a coordinator node; and
   at least one non-coordinator node.

6. The method of claim 1, further comprising:
   reading, using the backup application, the first list from the first virtual hard disk drive.

7. The method of claim 1, wherein
   the storage volume is a clustered shared volume.

8. A system comprising:
   at least one processor;
   a computer-readable storage medium coupled to the at least one processor; and
   computer code, encoded in the computer-readable storage medium and configured to cause the at least one processor to:
      initiate a snapshot of a storage volume, wherein
         a plurality of virtual machines access a plurality of virtual hard disk drives, and
         the plurality of virtual hard disk drives is stored on the storage volume,
      access at least a first list of a plurality of lists of a plurality of changes to data, wherein
         the data is stored in the plurality of virtual hard disk drives,
         a first virtual machine of the plurality of virtual machines comprises a first change tracker,
         the first list among the plurality of lists is generated by the first change tracker,
         the first change tracker tracks first changes to the data made by the first virtual machine,
         the first list comprises the first changes,
         the plurality of changes to the data comprises the first changes,
         the first virtual machine accesses a first virtual hard disk drive among the plurality of virtual hard disk drives,
         the plurality of changes to the data is made by the plurality of virtual machines, and
         the plurality of changes to the data is made subsequent to generation of a prior backup, and
      generate an incremental backup of the first virtual hard disk drive, wherein
         the computer code to generate comprises computer code to copy first data from the snapshot in response to the first list identifying that the data changed subsequent to the generation of the prior backup, wherein
            the data is changed by the first virtual machine.

9. The system of claim 8, wherein
   the plurality of lists of the plurality of changes to data is generated by a plurality of change trackers,
   the plurality of change trackers comprise the first change tracker, change trackers of the plurality of change trackers are implemented by respective virtual machines of the plurality of virtual machines.

10. The system of claim 8, further comprising computer code, encoded on the computer-readable storage medium, further configured to:
communicate at least the first list to a backup application.

11. The system of claim 8, wherein
a plurality of nodes implements the plurality of virtual machines, and
the plurality of lists is stored by the plurality of virtual hard disk drives.

12. The system of claim 11, wherein the plurality of nodes comprises:
a coordinator node; and
at least one non-coordinator node.

13. The system of claim 8, further comprising
computer code, encoded on the computer-readable storage medium, further configured to:
read, using a backup application, the first list from the first virtual hard disk drive.

14. The system of claim 8, wherein
the storage volume is a clustered shared volume.

15. A computer program product, comprising:
a non-transitory computer-readable storage medium encoding a plurality of instructions executable to:
initiate a snapshot of a storage volume, wherein
a plurality of virtual machines access a plurality of virtual hard disk drives, and
the plurality of virtual hard disk drives is stored on the storage volume;
access at least a first list of a plurality of lists of a plurality of changes to data, wherein
the data is stored in the plurality of virtual hard disk drives,
a first virtual machine of the plurality of virtual machines comprises a first change tracker,
the first list among the plurality of lists is generated by the first change tracker,
the first change tracker tracks first changes to the data made by the first virtual machine,
the first list comprises the first changes,
the plurality of changes to the data comprises the first changes,
the first virtual machine accesses a first virtual hard disk drive among the plurality of virtual hard disk drives,
the plurality of changes to the data is made by the plurality of virtual machines, and
the plurality of changes to the data is made subsequent to generation of a prior backup; and
generate an incremental backup of the first virtual hard disk drive, wherein
the plurality of instructions executable to generate comprises computer code to copy first data from the snapshot in response to the first list identifying that the data changed subsequent to the generation of the prior backup, wherein
the data is changed by the first virtual machine.

16. The computer program product of claim 15, wherein
the plurality of lists of the plurality of changes to data is generated by a plurality of change trackers,
the plurality of change trackers comprise the first change tracker,
change trackers of the plurality of change trackers are implemented by respective virtual machines of the plurality of virtual machines.

17. The computer program product of claim 15, wherein the plurality of instructions are further executable to:
communicate at least the first list to a backup application.

18. The computer program product of claim 15, wherein
a plurality of nodes implements the plurality of virtual machines, and
the plurality of lists is stored by the plurality of virtual hard disk drives.

19. The computer program product of claim 18, wherein the plurality of nodes comprises:
a coordinator node; and
at least one non-coordinator node.

20. The computer program product of claim 15, wherein the plurality of instructions are further executable to:
read, using a backup application, the first list from the first virtual hard disk drive.

* * * * *